March 16, 1954  T. S. SKILLMAN  2,672,219
CONTROL ARRANGEMENT FOR ARTICLE DISPENSING SYSTEMS
Filed Nov. 1, 1951  5 Sheets-Sheet 1

Inventor
Thomas S. Skillman
By Ward, Crosby & Neal
Attorneys

March 16, 1954　　　T. S. SKILLMAN　　　2,672,219
CONTROL ARRANGEMENT FOR ARTICLE DISPENSING SYSTEMS
Filed Nov. 1, 1951　　　　　　　　　　　　5 Sheets-Sheet 2

*Inventor*
*Thomas S. Skillman*
By Ward, Crosby & Neal
*Attorneys*

March 16, 1954  T. S. SKILLMAN  2,672,219
CONTROL ARRANGEMENT FOR ARTICLE DISPENSING SYSTEMS
Filed Nov. 1, 1951  5 Sheets-Sheet 4

Inventor
Thomas S. Skillman
By Ward, Crosby & Neal
Attorneys

March 16, 1954     T. S. SKILLMAN     2,672,219
CONTROL ARRANGEMENT FOR ARTICLE DISPENSING SYSTEMS
Filed Nov. 1, 1951     5 Sheets-Sheet 5
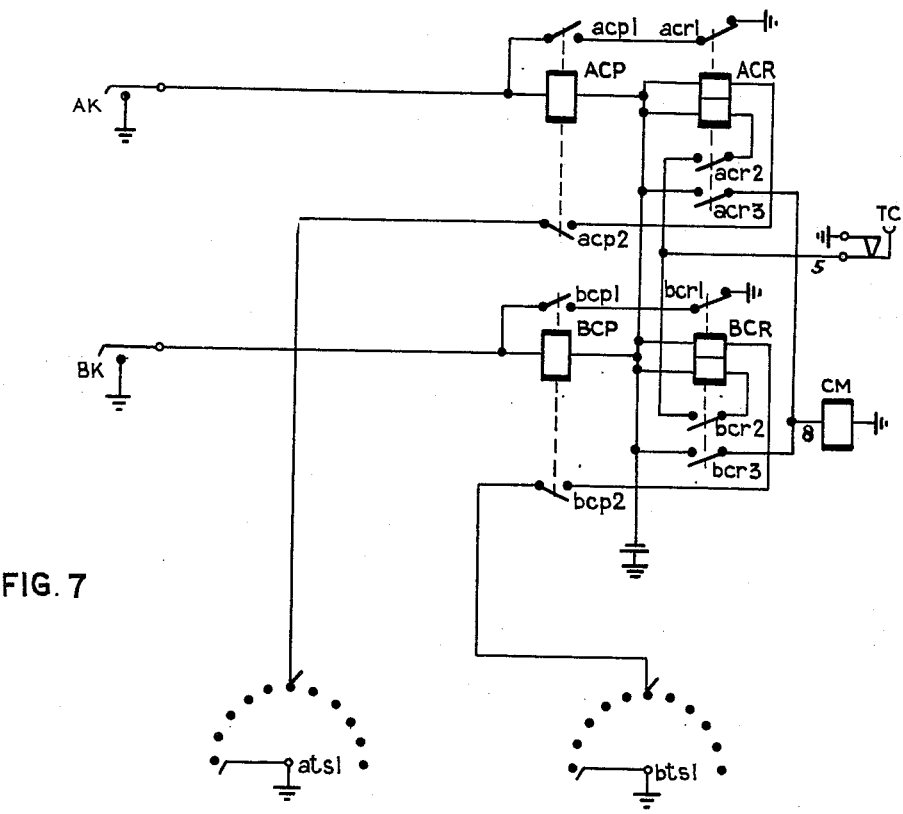
FIG. 7
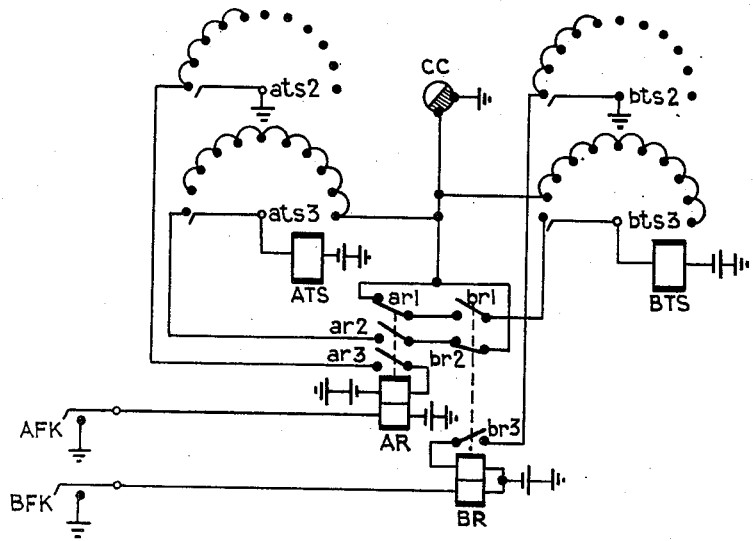
Inventor
Thomas S. Skillman
By Ward, Crooly & Neal
Attorneys Patented Mar. 16, 1954

2,672,219

UNITED STATES PATENT OFFICE 2,672,219

CONTROL ARRANGEMENT FOR ARTICLE DISPENSING SYSTEMS

Thomas S. Skillman, Mosman, near Sydney, New South Wales, Australia, assignor to Punch Engineering Pty. Limited, Cammeray, near Sydney, New South Wales, Australia, a corporation of New South Wales Application November 1, 1951, Serial No. 254,281

Claims priority, application Australia November 6, 1950

9 Claims. (Cl. 186—1)

The invention relates to article dispensing systems and particularly to those systems in which articles are released from storage by electrical means.

Article dispensing systems are known in which articles can be released from storage one at a time. These systems have the disadvantage that articles do not arrive together at the delivery point and if two batches of articles are released close together the last articles of one batch may mix with the first articles of the next batch.

These disadvantages are particularly serious when the system, for example for reasons of economy, uses a great number of storage and releasing devices in a row with one common conveyor to transport the released articles to a delivery point. With the increase in length of the common conveyor belt the time interval necessary to ensure adequate separation of the various batches of articles increases accordingly.

These disadvantages are overcome according to the invention by the provision of registering means in combination with release control means which permit the release of selected articles to be effected in a sequence independent of the sequence of selection. In a preferred embodiment of the invention the sequence is determined by the time taken for articles to travel on the common conveyor from their respective storage and releasing devices to a delivery point, so that each batch of articles is assembled on a particular part of the common conveyor.

One embodiment of the invention will be described in detail.

Fig. 7 is a modification of part of the equipment shown in Fig. 4 to permit operation of the apparatus by two operators.

Figure 1:
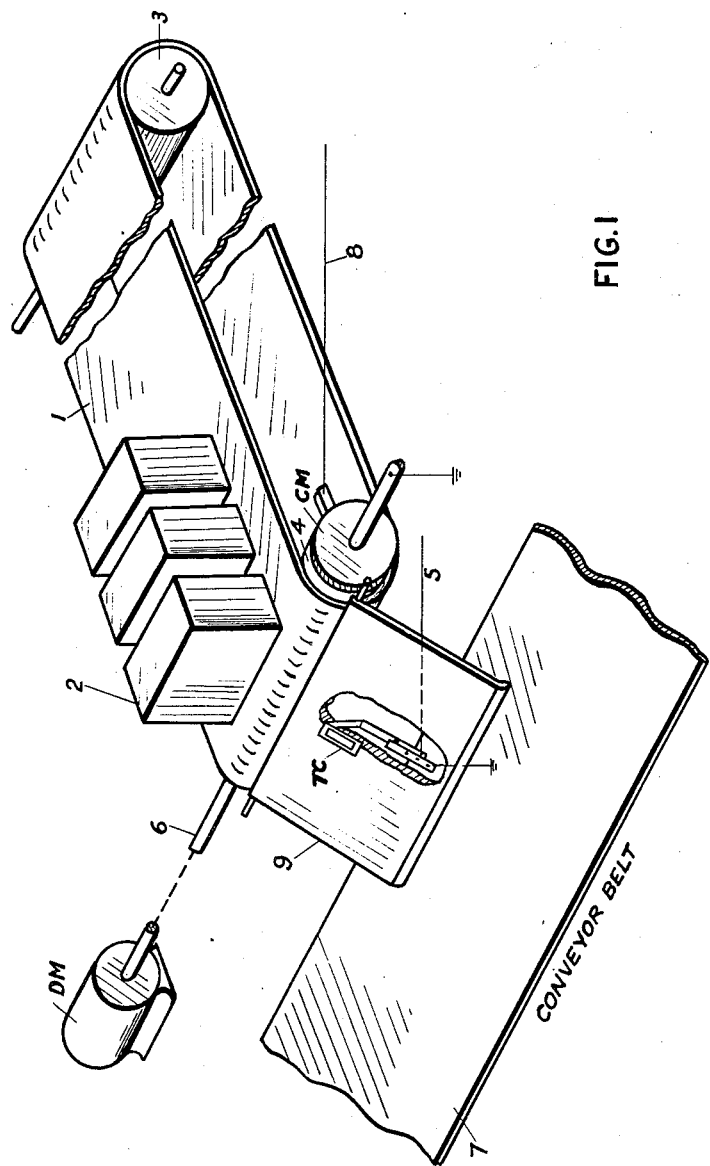
Fig. 1 is an isometric view of a storage and releasing device that may be used with this invention.

In Fig. 1 a storage and releasing device has a horizontally arranged storage belt 1, carrying articles 2 to be dispensed. The belt 1 passes around rollers 3 and 4, and the roller 4 contains an electromagnetic clutch CM mounted on a constantly running shaft 6, driven by driving motor DM, so that when the clutch CM is energised, the storage belt 1, which carries the articles 2, moves forward until an article topples over the roller 4 onto a common conveyor 7. The clutch CM is operated by an electric circuit over wire 8, as will be described later. When an article topples from the storage belt 1, it glides over a flap 9 and operates a trip contact TC which is effective, by means of an electric circuit over wire 5, to release the clutch CM, and thus prevent the release of the next article on belt 1.

Figure 2:
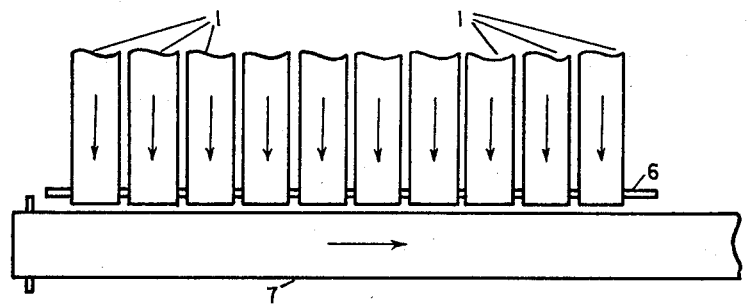
Fig. 2 is a plan view of a group of these storage and releasing devices and a common conveyor associated therewith.

In Fig. 2, ten such storage devices are shown in plan view disposed along the common conveyor 7. The rollers around which the storage belts 1 pass are all free to rotate about the shaft 6. The clutches and drive are not shown in this diagram.

It has been proposed to release articles simultaneously from each of a plurality of storage and releasing devices onto a common conveyor. Such an arrangement is for example, disclosed in my co-pending U. S. Patent application Serial No. 254,280 filed November 1, 1951, for "Control Arrangement for Article Dispensing Systems" (Aust. Pat. Appln. No. 37,963/50 filed November 6, 1950). Using this arrangement articles would be spread out over the conveyor for the full distance from the first to the last of the ten storage and releasing devices and a new batch of articles could only be released when the belt has travelled more than this full distance to avoid a mixing of articles of two successive orders. If the number of storage and releasing devices serving the conveyor 7 is increased, this distance and thus the time period between the release of successive batches of articles would increase accordingly. This time can be considerably reduced according to the invention by the operation of selected storage and releasing devices in a sequence according to the time taken for articles to travel on the conveyor from their respective storage and releasing device to a discharge point. If the sequence is so arranged that an article released from the first storage and releasing device has travelled on the conveyor up to the second storage and releasing device before an article is discharged from this latter device and so on, then all articles belonging to one batch will occupy only a small portion of the common conveyor and the release of the next batch of articles can already start shortly after the first article of the earlier batch has been released.

Figure 3:
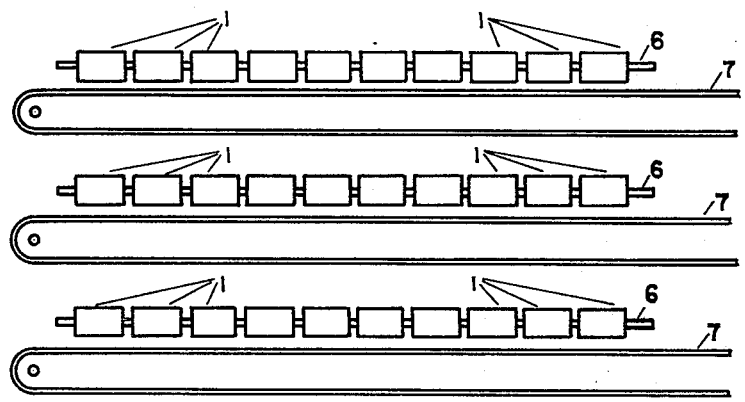
Fig. 3 is a front elevation of three groups of these storage devices arranged one above the other.

If several rows of storage and releasing devices are arranged as shown in Fig. 3 the articles can be released in sequence on each level so that they will arrive at the ends of their respective belts together, or at any desired interval to care for differences in travel time from the conveyors of the various levels to a common delivery point.

Figure 4:
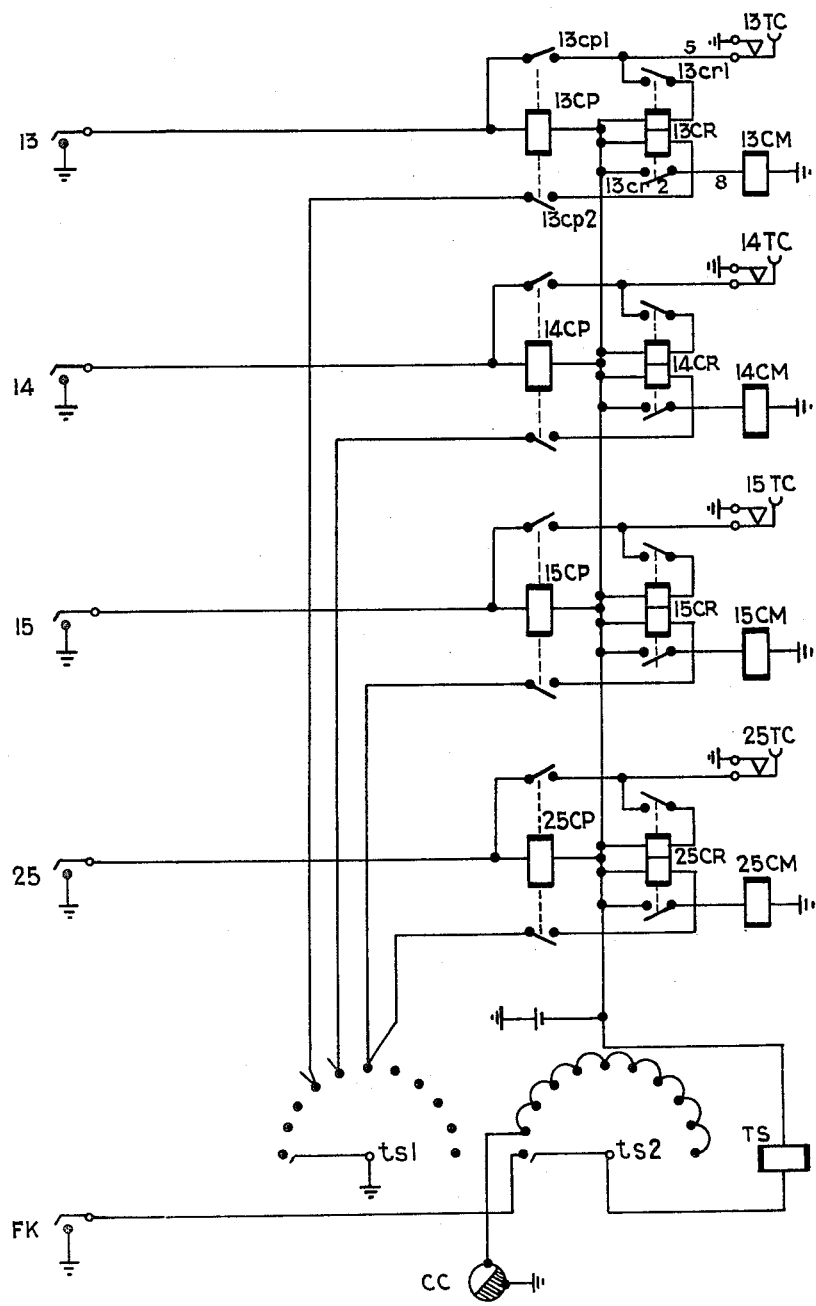
Fig. 4 is a schematic diagram of the electrical equipment associated with some of the storage devices in Fig. 3.

The electrical equipment used in one embodiment of the invention is shown in Fig. 4. The third, fourth and fifth storage and releasing devices of the first level shown in Fig. 3 and the fifth storage and releasing device of the second level of Fig. 3 are indicated by the clutches 13CM, 14CM, 15CM and 25CM respectively. The corresponding trip contacts are indicated by the contacts 13TC, 14TC, 15TC and 25TC. Each storage and releasing device is associated with registering means consisting of an operating relay 13CR, 14CR, 15CR and 25CR respectively and the registering relays 13CP, 14CP, 15CP and 25CP. These latter relays are connected with a selection circuit to store indications representing selected articles. The selection of articles is carried out by the operation of the keys 13, 14, 15, 25, one key being provided for each article to be selected. It must be understood, however, that instead of using individual keys for the selection of articles any other well known types of selecting devices may be used in which operation of digit keys, a telephone dial, or other contact devices, will temporarily apply an earth potential to any selected wire. For reasons of simplicity only the use of individual keys for each line is described. To indicate that a selection of a batch of articles has been completed and that the release of the selected articles from their storage and releasing devices can commence, an additional key FK is provided, which operates the common release equipment consisting of a rotary switch with the magnet TS and wipers and contact banks ts1, ts2, and the interrupter contact cc, which is operated by the driving means of the common conveyor belts.

Assuming that the key 13 is pressed for the selection of a corresponding article, relay 13CP is operated from earth over key 13, relay 13CP, to battery. This relay closes its contacts 13cp1 and 13cp2 and thereby establishes a locking circuit from earth over trip contact 13TC, closed contact 13cp1, relay 13CP, to battery. Contact 13cp2 prepares a circuit for the later operation of relay 13CR.

The operation of any of the other keys results in a similar operation of the associated relays. It must be understood that for each storage and releasing device in the system, a corresponding key and relay arrangement is provided.

After all the articles required for one batch have been selected in the above described manner, the key FK is pressed and closes a circuit for the magnet TS of the rotary switch from earth over key FK, first contact and wiper ts2, magnet TS, to battery. The rotary switch is so arranged that the wipers are stepped up each time the magnet TS releases. Thus, when key FK is released again the wipers ts1 and ts2 are stepped up to the second position. In all positions of wiper ts2 except the first one, a circuit is completed for magnet TS over interrupter contact cc, so that the switch is stepped up continually until the wiper ts2 reaches again the first contact at which the stepping circuit for magnet TS is broken again. This contact, as mentioned above, is operated by the driving means of the conveyor belts passing the storage and releasing devices and is so adjusted that it makes and breaks the contact while the conveyor belt travels from one storage and releasing device to the next one, so that the wipers ts1 and ts2 are stepped up in accordance with the travel time of the common conveyor from one storage and releasing device to the next one.

As the key 13 controls the third storage and releasing device in the first level (Fig. 3) a circuit is closed in the fourth position of the wiper ts1 from earth over wiper and contact bank ts1, operated contact 13cp2, relay 13CR, to battery. This relay locks itself over its operated contact 13cr1 and the trip contact 13TC and at the same time closes an operating circuit for the clutch 13CM from earth over clutch 13CM, operated contact 13cr2, to battery. The clutch 13CM thus operates the belt in the corresponding storage and releasing device to release an article therefrom. When the article topples over from the belt on to the conveyor, the trip contact 13TC is temporarily interrupted and breaks the locking circuit for the relay 13CR, and in the meantime the wiper ts1 of the rotary switch has made a further step. Relay 13CR cannot operate again after the locking circuit has been interrupted at its contact 13cr1 and at contact 13cr2 the circuit for the clutch 13CM is broken so that the storage and releasing device cannot deliver any further article.

While the wiper ts1 steps around similar circuits are operated for the corresponding storage and releasing devices which have been conditioned for operation by the operation of the corresponding registering relays.

When the wiper ts1 has reached the sixth position the operating relays 15CR and 25CR are operated simultaneously for the fifth storage and releasing device on the first level (Fig. 3) and the fifth storage and releasing device on the second level. By the time these articles are released the articles released from preceding storage and releasing devices on to the common conveyor will be opposite the fifth storage and releasing device, as the travel time of these articles is lined up with the stepping time of magnet TS by the corresponding adjustment of the interrupter contact cc, as mentioned before. Furthermore, articles released from corresponding storage and releasing devices in various levels, as shown in Fig. 4 by the clutch magnets 15CM and 25CM, are released at the same time so that all articles released from the various levels will reach the end of the common conveyor belts simultaneously and thus occupy only a very small part of the belts. Thus it is possible to release articles for a new batch shortly after the first articles of the first batch have been released, without the danger of mixing articles of two different batches.

Figure 5:
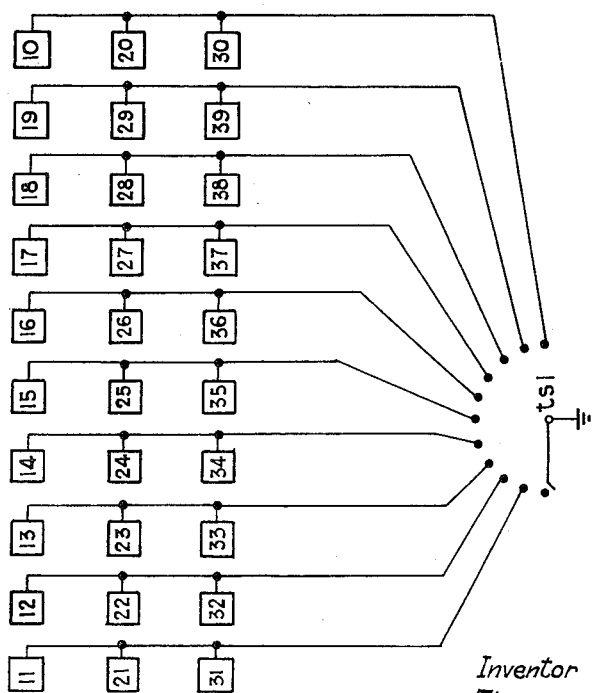

It will be seen that any number of clutches may be operated at the same time by connecting the associated relays to the same contact bank ts1. This contact bank may have as many contacts as there are storage and releasing devices arranged along the common conveyors. The principle of connecting the storage and releasing devices shown in Fig. 3 with the contact bank ts1 is shown in Fig. 5. The relay and clutch arrangements shown in detail in Fig. 4 are indicated in Fig. 5 by squares with corresponding figures and, as can be seen, the storage and releasing devices arranged vertically above each other on the different levels are all connected in parallel to one of the contacts of contact bank ts1, so that all articles will arrive at the same time at the end of the common conveyors. The arrangement can easily be altered, however, when it appears necessary to have the articles released at different times from the various levels, for example if the articles shall arrive at a common delivery point simultaneously, but different travel times have to be considered to bring articles from the various levels to one common level. In such a case, for example the storage and releasing devices 15, 26 and 37 could be connected to the same contact to allow for the time necessary to raise the articles from the lower levels to the highest level.

Figure 6:
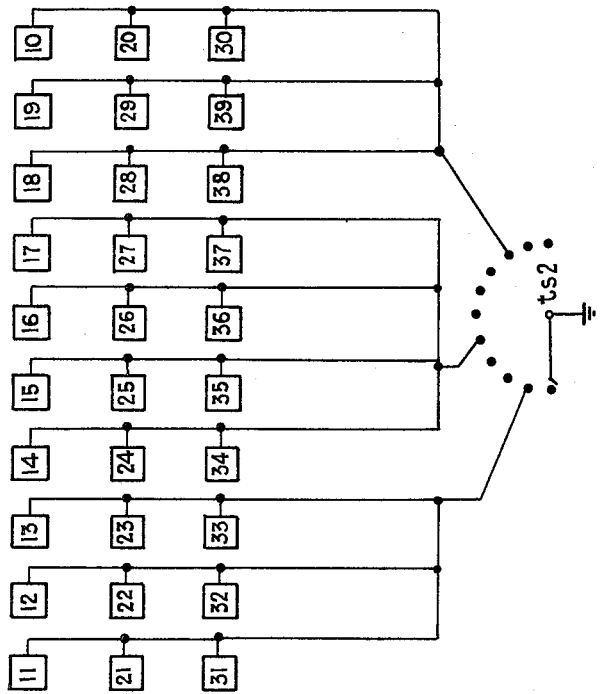
Figs. 5 and 6 are diagrams showing two different arrangements of the control equipment.

In Fig. 6 a simplified arrangement is shown in which the articles are released from the storage and releasing devices in three separate groups instead of ten groups. This latter arrangement is quite useful where less exact timing of article-release is required and the articles can be spread out further over the conveyor belt so that not all articles will fall on top of each other.

A modification of the arrangement shown in Fig. 4 to cater for the operation of storage and releasing devices by more than one operator is shown in Fig. 7. In this figure one storage and releasing device is indicated by the clutch magnet CM with its trip contact TC and associated therewith are one operating relay and one registering relay for each operator shown by the relays ACR, BCR and ACP, BCP respectively. The keys for the selection of a correponding article are shown as a key AK for an operator A and BK for an operator B and each operator has a delivery key AFK and BFK respectively, to initiate the release of articles from the storage and releasing devices after the selection of a batch of articles has been completed.

Whereas the operation of the registering means is the same as described in connection with Fig. 4, means have to be provided to block the release of articles selected by one operator while the release of articles selected by another operator is still in progress. For this purpose relays AR and BR operate their corresponding contacts to start the release of articles for one batch and at the same time interrupt the release circuits for articles selected for another batch.

The operation of the arrangement shown in Fig. 7 is as follows: If, for example, the operator A operates the key AK corresponding to a wanted article, relay ACP is energised to close a locking circuit over contact acr1, operated contact acp1, relay ACP, to battery. In a similar manner, operator B can, for example, select the same article by operating his key BK and the corresponding relay BCP, which locks itself over contacts bcr1 and bcp1. When one of the operators has finished the selection of articles belonging to one batch he presses the delivery key, for example the key AFK, and thus energises relay AR. This relay opens its contact ar1 and closes its contacts ar2 and ar3. Contact ar1 interrupts a circuit leading to the magnet BTS of a rotary switch associated with the operator B, so that no articles selected by the operator B can be released while the relay AR is operated. Over contact ar3 a locking circuit is established for relay AR via contact bank and wiper ats3. Contact ar2 closes a circuit from earth over interrupter contact cc, contact br2, contact ar2, first contact and wiper ats3, stepping magnet ATS, to battery. Thus the magnet ATS steps up the wipers ats1, ats2 and ats3 by the operation of the interrupter contact cc depending on the speed of the common conveyor belt, as described above in connection with Fig. 4.

When wiper ats2 has made a number of steps sufficient to ensure an adequate distance between two different batches of articles relay AR is released. This is shown in the drawing for five steps of wiper ats2. While the operation of the stepping magnet ATS is still going on it is now possible to release the next batch of articles by operating the stepping magnet BTS without the danger of mixing articles of the two batches on the common conveyor.

In case the key BFK has been pressed before the relay AR has been released, then relay BR is held in a locking circuit from earth over wiper and contact bank bs2, closed contacts br3, relay BR, to battery. The magnet BTS, however, cannot operate despite the closure of contacts br1 as its further circuit to the interrupter contact cc is interrupted at the contact ar1. As soon, however, as the relay AR releases, this circuit is closed and the stepping magnet BTS can operate in the same way as described before for the magnets ATS. At the same time the contact br2 interrupts the starting circuit for the magnet ATS so that when this magnet has finished its operation and the corresponding wipers are again in their home position no further operation is possible until the circuit for relay BR is interrupted again at wiper bts2.

When wiper ats1 reaches the contact corresponding to the selected storage and releasing device, a circuit is closed from earth over this wiper, closed contact acp2, relay ACR, to battery. This latter relay operates, interrupting the locking circuit for the relay ACP at its contact lacr1 and closing a locking circuit for itself over contacts acr2 and trip contact TC. At the same time relay ACR closes an operating circuit for the clutch magnet CM over contact acr3. As soon as an article is discharged, operation of the trip contact TC interrupts the locking circuit for relay ACR and thus returns the circuits to normal. Similarly, release of a selected article is effected over wiper bts1 and closed contact bcp2. Relay BCR by operating its contacts bcr1, bcr2 and bcr3, effects the release of an article selected by operator B. Although in the embodiment shown in Fig. 7 identical contacts of the switches ats1 and bts1 are connected through relevant contacts with the relays ACR and BCR respectively, it is also possible to arrange the connections so that the relays ACR and BCR are operated from different contacts of the switches.

If more than two operators shall be able to release articles from the storage and releasing device, similar relays and stepping switches have to be provided for each additional operator. Although an individual key for each article is shown in Fig. 7 the operators can make their selections by way of any known selection device, which finally results in the operation of a relay, for example, ACP or BCP, which is associated with a particular storage and releasing device.

I claim:

1. In a system for dispensing articles of varied character from a plurality of storage and releasing devices arranged at various distances from a common delivery point and connected therewith by conveying means: a selecting mechanism adapted for the selection of a batch of articles, and including electrical contact means operable for the individual selection in succession of said articles prior to their release from corresponding storage and releasing devices to give indications representing the selection of each article of said batch; registering means and electrical connections therefrom to said storage and releasing devices and said selecting mechanism operable to receive and electrically store said indications from said selecting mechanism and to condition the selected storage and releasing devices for operation; and electrical control means operable at the completion of the individual selection of all articles of said batch, and including a stepping device common to said registering means and said storage and releasing devices, said stepping device having successively operable contacts electrically connected with individual storage and releasing devices in a predetermined order dependent on the different travel times of said articles on said conveying means to actuate the storage and releasing devices conditioned by said registering means and to effect the release of all selected articles of said batch in steps determined by said order independent of the sequence of selection.

2. In a system for dispensing articles of varied character from a plurality of storage and releasing devices arranged at various distances from a common delivery point and connected therewith by conveying means: a plurality of selecting mechanism each adapted for the selection of a batch of articles, and including electrical contact means operable for the individual selection in succession of said articles prior to their release from corresponding storage and releasing devices to give indications representing the selection of each article of said batch; registering means and electrical connections therefrom to any of said storage and releasing devices and each of said selecting mechanism, said registering means being operable to receive and electrically store said indications from said selecting mechanism and to condition the selected storage and releasing devices for operation; and electrical control means operable at the completion of the individual selection of all articles of a batch, and including a separate stepping device for each of said selecting mechanisms and said registering means, each of said stepping devices having successively operable contacts electrically connected with individual storage and releasing devices in a predetermined order dependent on the different travel times of said articles on said conveying means to actuate the storage and releasing devices conditioned by the corresponding selecting mechanism and to effect the release of all articles selected by said corresponding selecting mechanism in steps determined by said order independent of the sequence of selection.

3. In a system for dispensing articles of varied character from a plurality of storage and releasing devices arranged at various distances from a common delivery point and connected therewith by conveying means: a plurality of selecting mechanisms each adapted for the selection of a batch of articles, and including electrical contact means operable for the individual selection in succession of said articles prior to their release from corresponding storage and releasing devices to give indications representing the selection of each article of said batch; registering means and electrical connections therefrom to any of said storage and releasing devices and each of said selecting mechanisms, said registering means being operable to receive and electrically store said indications from said selecting mechanisms and to condition the selected storage and releasing devices for operation; and electrical control means operable at the completion of the individual selection of all articles of a batch, and including a separate stepping device for each of said selecting mechanisms and said registering means, each of said stepping devices having successively operable contacts electrically connected with individual storage and releasing devices in a predetermined order dependent on the different travel times of said articles on said conveying means to actuate the storage and releasing devices conditioned by the corresponding selecting mechanism to effect the release of all articles selected by said corresponding selecting mechanism, driving means connected with said stepping devices to operate said stepping devices in steps determined by said order independent of the sequence of selection, and blocking means operable on actuation of any of said stepping devices to interrupt the connection between the driving means and the stepping devices associated with any other selecting mechanism.

4. In a system for dispensing articles of varied character from a plurality of storage and releasing devices: a selecting mechanism operable to give indications representing the selection of each article of a batch of articles; registering means and electrical connections therefrom to said storage and releasing devices and said selecting mechanism, said registering means including a first relay and a second relay individual to each of said storage and releasing devices, said first relay being operable by said selecting mechanism to close a locking circuit for itself and to prepare a circuit for said second relay associated therewith; control means including a rotary switch having electrical connections from each of said second relays to a contact of said rotary switch and being operable to actuate said prepared second relays in a sequence determined by the stepping of said rotary switch, said second relays breaking the locking circuits of said first relays, closing locking circuits for themselves and operating the corresponding storage and releasing devices; and a contact device associated with each storage and releasing device electrically interposed in the locking circuit of the corresponding second relay and operable by an article released from the corresponding storage and releasing device to break said locking circuit.

5. In a system for dispensing articles of varied character from a plurality of storage and releasing devices: a selecting mechanism operable to give indications representing the selection of each article of a batch of articles; registering means and electrical connections therefrom to said storage and releasing devices and said selecting mechanism, said registering means including a first relay and a second relay individual to each of said storage and releasing devices, said first relay being operable by said selecting mechanism to close a locking circuit for itself and to prepare a circuit for said second relay associated therewith; control means including a rotary switch, a mechanically operated interrupter contact to step up said rotary switch and manually operable contact means electrically connected with said switch to initiate the stepping of said switch, said rotary switch having electrical connections from its contacts to each of said second relays, and being operable to actuate said prepared second relays in a sequence determined by the stepping of said switch, said operated second relays breaking the locking circuits of said first relays, closing locking circuits for themselves and operating the corresponding storage and releasing devices; and a contact device associated with each storage and releasing device electrically interposed in the locking circuit of the corresponding second relay and operable by an article released from the corresponding storage and releasing device to break said locking circuit.

6. In a system for dispensing articles of varied character from a plurality of storage and releasing devices arranged in substantially horizontal rows: conveying means common to each row of said storage and releasing devices and movable past the discharging ends of said devices; a selecting mechanism operable to give indications representing the selection of each article of a batch of articles; registering means and electrical connections therefrom to said storage and releasing devices and said selecting mechanism, said registering means including a first relay and a second relay individual to each of said storage and releasing devices, said first relay being operable by said selecting mechanism to close a locking circuit for itself and to prepare a circuit for said second relay associated therewith; control means including a rotary switch, a mechanically operated interrupter contact driven in fixed relationship to said conveying means to step up said rotary switch at time intervals depending on the travel time of said conveying means from one storage and releasing device to the next, and manually operable contact means electrically connected with said switch to initiate the stepping of said switch, said rotary switch having electrical connections from its contacts to each of said second relays and being operable to actuate said prepared second relays in a sequence determined by the stepping of said switch, said operated second relays breaking the locking circuits of said first relays, closing locking circuits for themselves and operating the corresponding storage and releasing devices; and a contact device associated with each storage and releasing device electrically interposed in the locking circuit of the corresponding second relay and operable by an article released from the corresponding storage and releasing device to break said locking circuit.

7. In a system for dispensing articles of varied character from a plurality of storage and releasing devices: a selecting mechanism operable to give indications representing the selection of each article of a batch of articles; registering means and electrical connections therefrom to said storage and releasing devices and said selecting mechanism, said registering means including a first relay and a second relay individual to each of said storage and releasing devices, said first relay being operable by said selecting mechanism to close a locking circuit for itself and to prepare a circuit for said second relay associated therewith; control means including a rotary switch and an electrical connection from each of said second relays to a contact of said rotary switch, some of said second relays being connected to the same contact of said switch, said control means being operable to actuate said prepared second relays in a sequence determined by the stepping of said rotary switch, said second relays breaking the locking circuits of said first relays, closing locking circuits for themselves and operating the corresponding storage and releasing devices; and a contact device associated with each storage and releasing device electrically interposed in the locking circuit of the corresponding second relay and operable by an article released from the corresponding storage and releasing device to break said locking circuit.

8. In a system for dispensing articles of varied character from a plurality of storage and releasing devices arranged in substantially horizontal rows: conveying means common to each row of said storage and releasing devices and movable past the discharging ends of said devices; a plurality of selecting mechanisms each operable to give indications representing the selection of each article of a batch of articles; registering means and electrical connections therefrom to said storage and releasing devices and said selecting mechanisms, said registering means including a plurality of first and second relays for each storage and releasing device, each of said first relays being independently operable by a corresponding selecting mechanism to close a locking circuit for itself and to prepare a circuit for the second relay associated therewith; a plurality of control means one for each of said selecting mechanisms, each including a rotary switch and a manually operated contact means electrically connected with said switch to initiate the stepping of said switch; common to said plurality of control means a mechanically operated interrupter contact driven in fixed relationship to said conveying means to step up said rotary switches at time intervals depending on the travel time of said conveying means from one storage and releasing device to the next, each of said rotary switches having electrical connections from its contacts to each of the corresponding second relays, each control means being operable to actuate second relays conditioned by the corresponding selecting mechanism in a sequence determined by the stepping of the corresponding rotary switch, said operated second relays breaking the locking circuits of said first relays, closing locking circuits for themselves and operating the corresponding storage and releasing devices; and a contact device associated with each storage and releasing device electrically interposed in the locking circuit of the corresponding actuated second relay and operable by an article released from said storage and releasing device to break said locking circuit.

9. In a system for dispensing articles of varied character from a plurality of storage and releasing devices arranged in substantially horizontal rows: conveying means common to each row of said storage and releasing devices and movable past the discharging ends of said devices; a plurality of selecting mechanisms each operable to give indications representing the selection of each article of a batch of articles; registering means and electrical connections therefrom to said storage and releasing devices and said selecting mechanism, said registering means including a plurality of first and second relays for each storage and releasing device, each of said first relays being independently operable by a corresponding selecting mechanism to close a locking circuit for itself and to prepare a circuit for the second relay associated therewith; a plurality of control means one for each of said selecting mechanisms, each including a rotary switch, a manually operated contact means and a control relay electrically connected therewith and operable thereby to initiate the stepping of said switch; common to said plurality of control means a mechanically operated interrupter contact driven in fixed relationship to said conveying means to step up said rotary switches at time intervals depending on the travel time of said conveying means from one storage and releasing device to the next, each control relay upon operation connecting said interrupter contact with the corresponding rotary switch and interrupting the connections between said interrupter contact and all other rotary switches, said interruption being maintained for a predetermined number of steps made by said corresponding rotary switch, each of said rotary switches having electrical connections from its contacts to each of the corresponding second relays, each control means being operable to actuate second relays conditioned by the corresponding selecting mechanism in a sequence determined by the stepping of the corresponding rotary switch, said operated second relays breaking the locking circuits of said first relays, closing locking circuits for themselves and operating the corresponding storage and releasing devices; and a contact device associated with each storage and releasing device electrically interposed in the locking circuit of the corresponding actuated second relay and operable by an article released from said storage and releasing device to break said locking circuit.

THOMAS S. SKILLMAN.

References Cited in the file of this patent

UNITED STATES PATENTS

| Number | Name | Date |
|---|---|---|
| 2,083,947 | Furber | June 15, 1937 |
| 2,227,778 | Fishbach | Jan. 7, 1941 |
| 2,319,788 | Bryan | May 25, 1943 |
| 2,374,537 | Goldsmith | Apr. 24, 1945 |
| 2,416,870 | Farmer | Mar. 4, 1947 |
| 2,497,874 | Evans | Feb. 21, 1950 |
| 2,567,241 | Skillman | Sept. 11, 1951 |

FOREIGN PATENTS

| Number | Country | Date |
|---|---|---|
| 511,285 | Great Britain | of 1939 |
| 518,679 | Great Britain | of 1940 |